United States Patent [19]

Nomura et al.

[11] Patent Number: 5,681,888

[45] Date of Patent: Oct. 28, 1997

[54] POLYETHERKETONE RESIN COMPOSITIONS AND CARRIES FOR PROCESSING AND TREATING SEMICONDUCTOR WAFERS

[75] Inventors: Hideo Nomura, Tsukuba; Tadayasu Kobayashi, Toyonaka; Mitsuo Maeda, Tsukuba; Kuniaki Asai, Tondabayashi, all of Japan

[73] Assignee: Sumitomo Chemical Company Limited, Osaka, Japan

[21] Appl. No.: 582,340

[22] Filed: Jan. 19, 1996

[30] Foreign Application Priority Data

Jan. 20, 1995 [JP] Japan .................. 7-007107

[51] Int. Cl.⁶ ........................ C08K 3/04
[52] U.S. Cl. ............ 524/496; 524/848; 524/425; 524/430; 524/449; 524/451; 524/445
[58] Field of Search ............. 524/496, 848

[56] References Cited

U.S. PATENT DOCUMENTS 4,804,697  2/1989  Saito et al. ............... 524/496
5,131,827  7/1992  Tasaka ..................... 524/601

Primary Examiner—Melvyn I. Marquis
Attorney, Agent, or Firm—Birch, Stewart, Kolasch & Birch, LLP

[57] ABSTRACT

A polyetherketone resin composition comprising 5-100 parts by weight of a carbon fiber having an average fiber diameter of 5-20 μm and an average fiber length of 30-500 μm per 100 parts by weight of a composition comprising 95-50% by weight of a polyetherketone and 5-50% by weight of a liquid crystal polyester, and a carrier for processing or treating a semi-conductor wafer molded from the above polyetherketone resin composition. Said composition is excellent in molding properties and said carrier is excellent in stiffness, dimensional stability and antistatic properties.

The above liquid crystal polyester includes, for example, those consisting of repeating structural units (I), (II), (III) and (IV), shown below, in a molar ratio (II)/(I) of 0.2–1.0, a molar ratio [(III)+(IV)]/(II) of 0.9–1.1 and a molar ratio (IV)/(III) of 0–1.0.

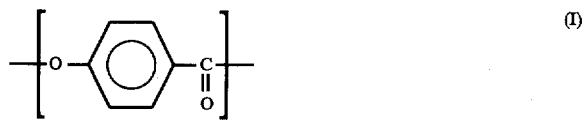

(I)

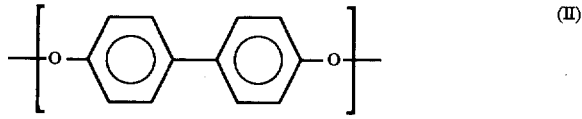

(II)

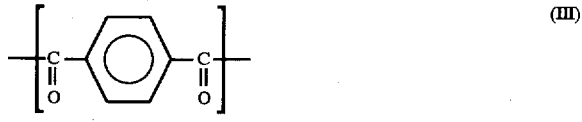

(III)

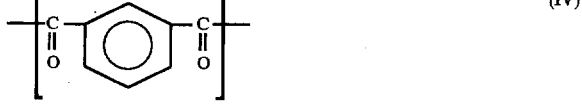

(IV)

7 Claims, 1 Drawing Sheet

POLYETHERKETONE RESIN COMPOSITIONS AND CARRIES FOR PROCESSING AND TREATING SEMICONDUCTOR WAFERS

BACKGROUND OF THE INVENTION

1. Field of the Invention

The present invention relates to carriers for processing and treating semiconductor wafers and polyetherketone resin compositions which are used to produce such carriers and which are excellent in molding properties, dimensional stability, mechanical characteristics and antistatic properties.

2. Background Information

Semiconductor wafers, represented by silicone wafers, need to be subjected to various processing and treating steps in order to produce IC (integrated circuit) chips, the desired product. For example, a silicone semiconductor IC is produced starting from a mirror wafer made from silica as a raw material and after repeating steps of oxidation, application of photoresist, masking, exposure to light, etching, crystal growth by CVD (chemical vapor deposition) under reduced pressure, washing and so on. Carrier materials used in such wafer treating steps include a copolymer of tetrafluoroethylene and perfluoroalkylvinylether (hereinafter, abbreviated as PFA), aluminum metal, polypropylene and the like. Generally, the PFA carrier has been used mainly for washing wafers and for storing wafers after impurity diffusing treatment, the aluminum metal carrier for resist baking and polypropylene carrier for conveyance. Transshipping of wafers between steps is usually carried out by robot. Besides, when PFA carrier is used for storing or in resist baking up to 200° C., problems that it has big tendency of deformation by softening at high temperature, that it is inferior in dimensional accuracy by much contraction in molding and so on may rise. In order to avoid such problems, JP-A-60-147121, for example, discloses a use of a polyetherketone resin (hereinafter, abbreviated as PEEK) in place of the PFA resin for the production of containers for treating wafers. Even if, however, PEEK is used singly for a carrier material, inconvenience may occur in practical use due to defects that its stiffness at high temperature is insufficient, that there is a fear of deformation during resist baking, that its dimensional accuracy above 143° C. is inferior because said temperature is the glass transition temperature of PEEK and, further, sometimes filling of resin for shaping becomes insufficient due to the fact that PEEK resin has a high melt viscosity, which results in inferior flowability on carrier molding. Still, the above defects of PEEK carrier leads to increased practical inconvenience than before with the scaling up of wafer size.

An object of the present invention is to solve the above described problems and to provide carriers for processing and treating semiconductor wafers which are excellent in stiffness, dimensional stability and antistatic properties and to provide polyetherketone resin composition which give such carriers and which are excellent in molding properties.

As the results of extensive studies for solving above described problems, the present inventors have found the facts that compositions capable of attaining the above object can be obtained by compounding specific amounts of a liquid crystal polyester and a carbon fiber to a polyetherketone resin and that carriers molded from the above composition have an excellent characteristics during the processing and treating steps of them, and based on said facts, the present invention has been completed.

SUMMARY OF THE INVENTION

Accordingly, the present invention has the following features:

(1) A polyetherketone resin composition comprising 5–100 parts by weight of a carbon fiber having an average fiber diameter of 5–20 μm and an average fiber length of 30–500 μm per 100 parts by weight of a composition comprising 95–50% by weight of a polyetherketone and 5–50% by weight of a liquid crystal polyester.

(2) The polyetherketone resin composition according to above (1) which has a surface resistivity of a molded shape $10^8$–$10^{12} \Omega$.

(3) The polyetherketone resin composition according to above (1) or (2), in which the liquid crystal polyester comprises at least 30% by mole of a repeating structural unit represented by the following formula (A1):

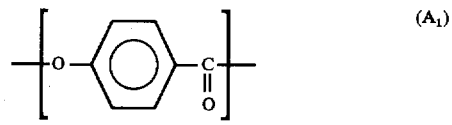

(4) The polyetherketone resin composition according to above (1) or (2), in which the liquid crystal polyester comprises repeating structural units (I), (II), (III) and (IV), shown below, in a molar ratio (II)/(I) of 0.2–1.0, a molar ratio [(III)+(IV)]/(II) of 0.9–1.1 and a molar ratio (IV)/(III) Of 0–1.0.

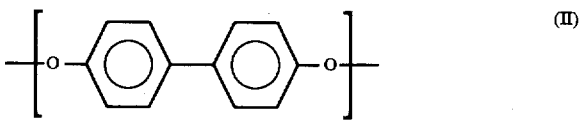

(5) The polyetherketone resin composition according to above (1), (2), (3) or (4), in which the polyetherketone has a structure represented by the following formula:

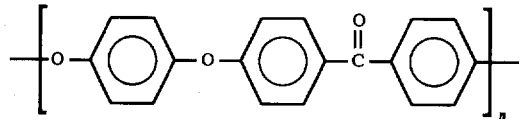

(6) The polyetherketone resin composition according to above (5), in which the polyetherketone has a melt viscosity of 500–3800 poise obtained by the following method.

The method for measuring melt viscosity:

An apparent melt viscosity observed when a resin sample heated at 400° C. is extruded through a nozzle 1 mm in inner diameter and 10 mm in length at a shear rate of 1000 sec$^{-1}$.

(7) A carrier for processing or treating a semiconductor wafer molded from the polyetherketone resin composition according to dove (1), (2), (3), (4), (5) or (6).

DETAILED DESCRIPTION OF THE INVENTION

Figure 1:
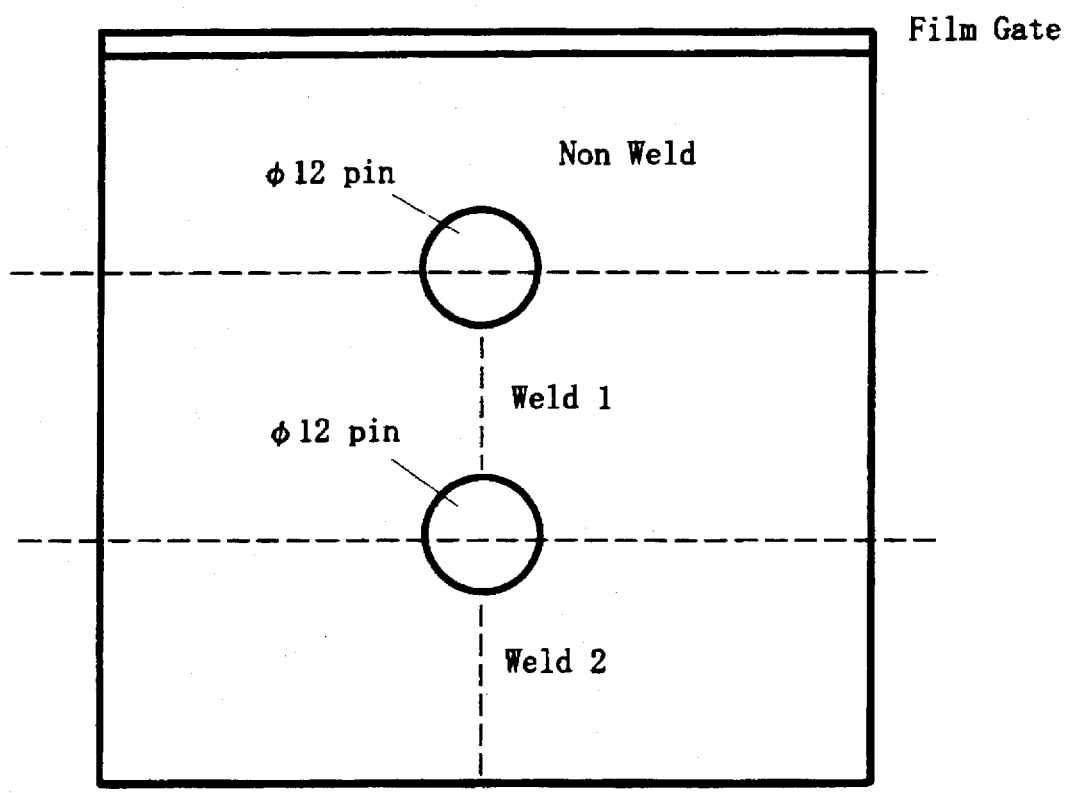
FIG. 1 shows a plan view of a test piece for measuring weld strength.

The polyetherketone resin used in the present invention refers to a resin having both of a phenylketone structure and a phenylether structure. As examples of the polyetherketone structure, the following structures are included without limitation.

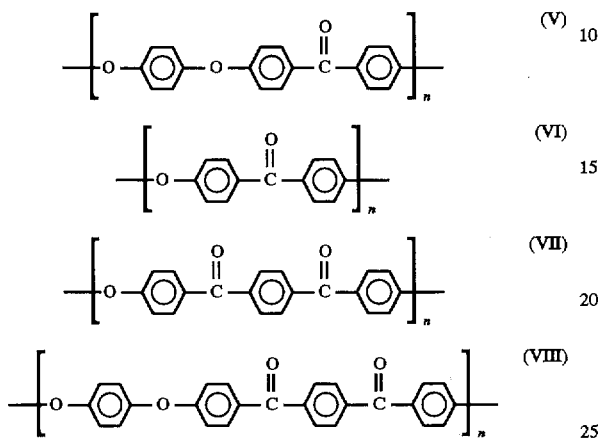

From a view point of balance in heat resistance, mechanical properties and processability, a particularly preferred polyetherketone is the one having the repeating structural unit represented by the above (V), which includes products commercially available under the trade name Victrex PEEK (manufactured by VICTREX).

As grades of Victrex PEEK products, 150P, 151P, 380P, 381P, 450P, 450G and so on are included, and their melt viscosity measured by a method shown below are 1500 poise, 1500 poise, 3800 poise, 3800 poise, 4500 poise and 4500 poise, respectively, in this order. The method for measuring melt viscosity:

An apparent melt viscosity observed when a resin sample heated at 400° C. is extruded from a nozzle having an inner diameter of 1 mm and a length of 10 mm at a shear rate of 1000 $sec^{-1}$.

When the melt viscosity measured by the above method is higher than 3800 poise, an effect of giving an excellent molding properties, which is an object of the present invention, is somewhat lowered.

When the melt viscosity is lower than 500 poise, in turn, the mechanical properties of the polyetherketone itself is somewhat lowered.

The liquid crystal polyester used in the present invention refers to a polyester called thermotropic liquid crystal polyester, including:

(1) one formed by a combination of an aromatic dicarboxylic acid, an aromatic diol and an aromatic hydroxycarboxylic acid;

(2) one formed by a combination of different kinds of aromatic hydroxycarboxylic acid;

(3) one formed by a combination of an aromatic dicarboxylic acid and an aromatic diol; and (4) one formed by reacting a polyester such as polyethylene terephthalate with an aromatic hydroxycarboxylic acid; and the like, which form an anisotropic melt at a temperature of 400° C. or less.

Further, in place of the aromatic dicarboxylic acid, aromatic diol or aromatic hydroxycarboxylic acid, their ester forming derivative may be used.

As repeating structural units in said liquid crystal polyester, the following units are included without limitation.

Repeating structural units derived from aromatic carboxylic acids:

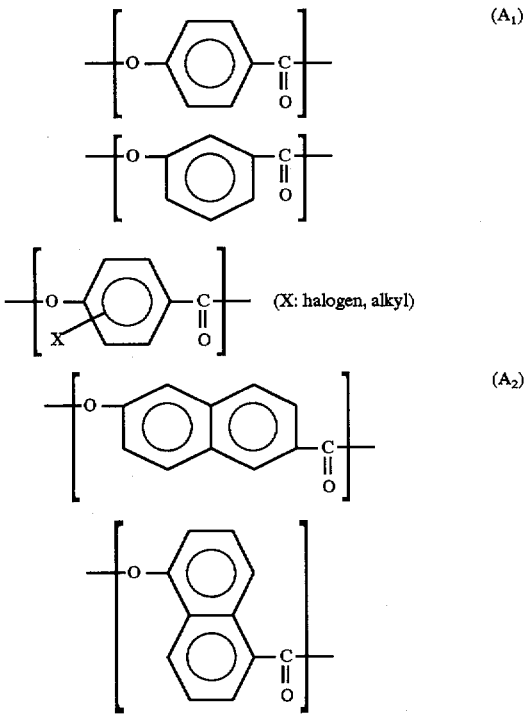

Repeating structural units derived from aromatic di-carboxylic acids:

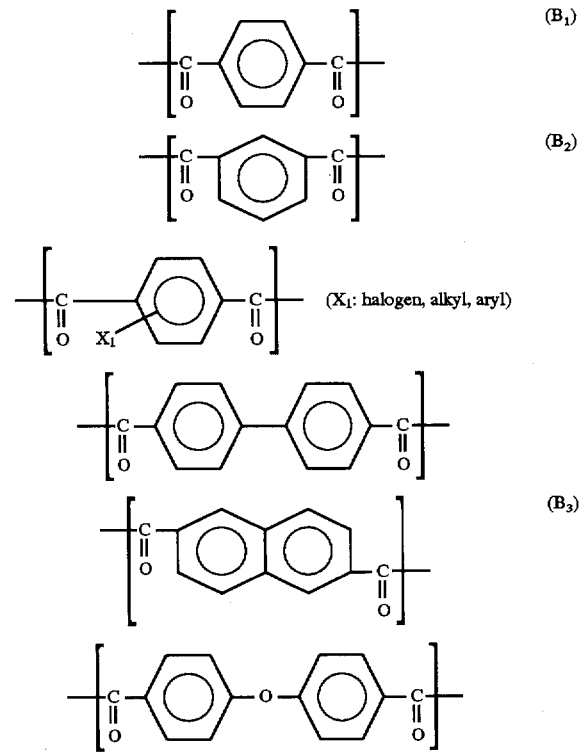

-continued

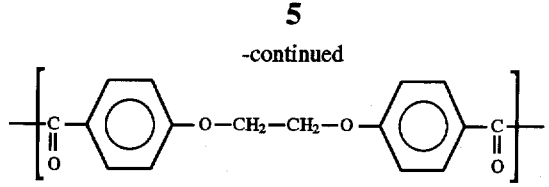

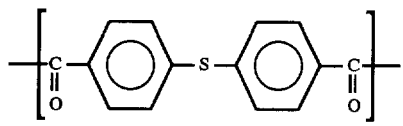

Repeating structural units derived from aromatic diols:

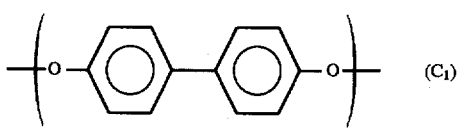 (C₁)

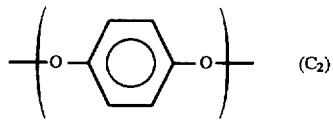 (C₂)

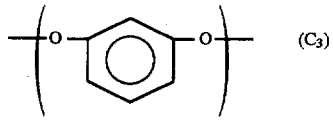 (C₃)

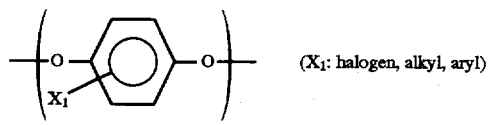 (X₁: halogen, alkyl, aryl)

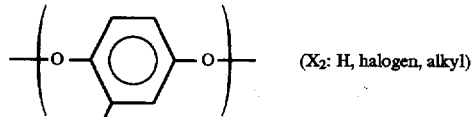 (X₂: H, halogen, alkyl)

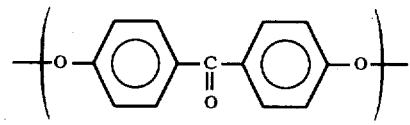

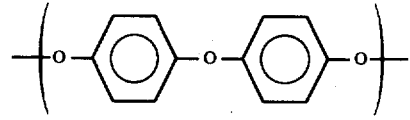

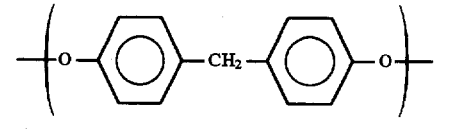

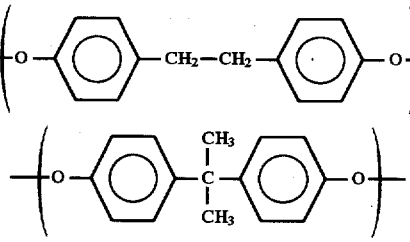

-continued

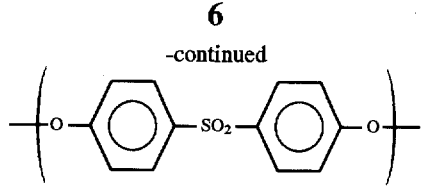

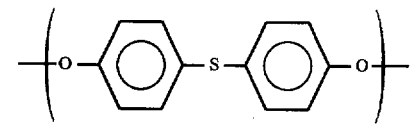

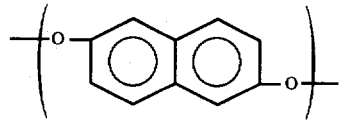

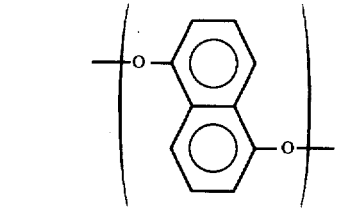

Liquid crystal polyesters preferred from a viewpoint of balance in heat resistance, mechanical properties and processability are those containing at least 30% by mole of a structural unit represented by the following formula (A₁):

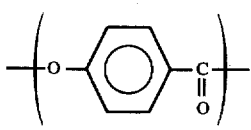 (A₁)

Specifically, polyesters having a combination of repeating structural units shown by the following formulations (a)–(f) are preferred:

(a): (A₁), (B₁) or a mixture of (B₁) and (B₂), and (C₁).
(b): (A₁), and (A₂);
(c): in the combination (a) of repeating structural units, a part of A₁ is replaced by A₂;
(d): in the combination (a) of repeating structural units, a part of B₁ is replaced by B₃;
(e): in the combination (a) of repeating structural units, a part of C₁ is replaced by C₃; and
(f): the structural units B₁ and C₁ are added to the structural units in (b).

The liquid crystal polyesters (a) and (b) of the basic structure are disclosed, for example, in JP-B-47-47870 and JP-B-63-3888, respectively. Particularly preferred liquid crystal polyesters include those comprising repeating structural units (I), (II), (III) and (IV), shown before, in a molar ratio (II)/(I) of 0.2–1.0, a molar ratio [(III)+(IV)]/(II) of 0.9–1.1 and a molar ratio (IV)/(III) of 0–1.0.

The carbon fiber used in the present invention is a fibrous material, of which 90% or more in chemical constitution is carbon, and for which polyacrylonitrile, pitch, regenerated cellulose and the like may be used as the starting material. Materials produced by treating a fibrous precursor spun from these starting materials at 1000°–2000° C. or those produced by graphitizing the same at 2000°–3000° C. are generally used because of their high strength and high elasticity. Use of polyacrylonitrile as the starting material is preferred for obtaining more strong and more elastic materials. Means for obtaining carbon fibers having an average fiber length of 500 μm or less is not particularly limited but such fibers are generally prepared by hammering-milling with a metal, ceramic or the like. The carbon fiber used in the present invention has an average fiber diameter of 5–20 µm and an average fiber length of 30–500 µm. Preferred carbon fiber has an average fiber diameter of 5–15 µm and an average fiber length of 30–200 µm. A fiber having an average fiber diameter of less than 5 µm is not preferred because take-up properties of extruded product during melt-kneading with an extruder for producing a composition is inferior, although its effects improving stiffness, dimensional stability and antistatic properties, which are desired in the present invention, are not significantly different from those having an average diameter of 5–20 µm. A fiber having an average fiber diameter more than 20 µm is not preferred because the external appearance of a molded product and uniformity of dispersion of the fiber in a molded product are unsatisfactory. On the other hand, a fiber having an average fiber length less than 30 µm is not preferred because the stiffness of the composition becomes insufficient. A fiber having an average fiber length more than 500 µm is not preferred due to the facts that the carbon fibers come up to the surface of a molded product and the condition of the surface becomes rough, and that it may cause contamination. when a molded product obtained from it is used as a carrier for processing and treating a semiconductor wafer.

Commercial carbon fibers manufactured from polyacrylonitrile include those available under trade names PYROFIL M-FE, M-ME (manufactured by MITSUBISHI RAYON CO., LTD.), BESFIGHT HTA-CMF-0070N/S, HTA-CMF-0160N/S (manufactured by TOHO RAYON CO., LTD.) and the like. Commercial carbon fibers manufactured from pitch include those available under a trade name M2007S (manufactured by KUREHA CHEMICAL INDUSTRY CO., LTD.).

The compounding ratio of a polyetherketone and a liquid crystal polyester in the polyetherketone resin composition of the present invention is preferably 5–50% by weight of the liquid crystal polyester per 95-50% by weight of polyetherketone. Particularly preferred compounding ratio is 10–30% by weight of liquid crystal polyester per 90-70% by weight of polyetherketone. A compounding amount of the liquid crystal polyester less than 5% by weight is not preferred because flowability during molding-processing and an effect of improving dimensional accuracy at high temperature are unsatisfactory. Also, a compounding amount of the liquid crystal polyester more than 50% by Weight is not preferred because the weld strength of a molded product decreases.

In the polyetherketone resin composition of the present invention, it is preferred that the compounding amount of a carbon fiber having an average fiber diameter of 5–20 µm and an average fiber length of 30–500 µm is 5–100 parts by weight per 100 parts by weight of a composition comprising 95-50% by weight of a polyetherketone and 5–50% by weight of a liquid crystal polyester. Particularly preferred compounding amount is 10–50% by weight. A compounding amount of the carbon fiber less than 5 parts by weight is not preferred because an effect of improving antistatic properties and stiffness of the molded product is insufficient. Also, a compounding amount of the carbon fiber more than 100 parts by weight is not preferred due to the facts that the electrical conductivity of a molded product becomes too high, that there is a fear of causing trouble on introduction of electric current when used as a carrier for processing/treating semiconductor wafer, and that the surface of a molded product becomes rough.

It is preferred that molded products produced from the polyetherketone resin composition have a surface resistivity of $10^8 \Omega$–$10^{12} \Omega$. Products having a surface resistivity more than $10^{12} \Omega$ are not preferred because antistatic properties of the molded products become insufficient, foreign matters such as dusts tend to attach and they may contaminate the semiconductor wafers. Also, products having a surface resistivity less than $10^8 \Omega$ are not preferred due to the facts that the electrical conductivity of a molded product becomes too high, that there is a fear of causing trouble on introduction of electric current when used as a carrier for processing-treating semiconductor wafer, and that the surface of a molded product becomes rough.

In the application according to the present invention, release of much amount of occluded gas from a molded product on use raises a problem. While, in the composition of the present invention, some Mount of polymerization solvent for polyetherketone as represented by diphenylsulfone may be detected as the occluded gas, such releasing gas can be decreased by annealing treatment of the molded product down to a level at which practically no problem is present. Generally used annealing conditions include a treatment at 180°–230° C. for 1–10 hours.

If necessary, the composition according to the present invention may additionally contain one or more usual additives such as fibrous or needle-like reinforcing materials including glass fibers, silica-alumina fibers, wollastonite, potassium titanate whisker and the like, inorganic fillers including calcium carbonate, dolomite, talc, mica, clay, glass beads and the like, release agent including fluorine resin and the like, coloring agents including dyes, pigments and the like, antioxidants, heat stabilizers, ultraviolet absorbers, antistatic agents, surface activators, or the like.

Further, a small amount of one or more thermoplastic resins, for example, polyamide, polyester, polyphenylenesulfide, polycarbonate, polyphenyleneether and its modified product, polysulfone, polyethersulfone, polyetherimide and the like, as well as a small amount of thermoset resin, for example, phenol resin, epoxy resin, polyimide resin and the like, can be added.

In the preparation of the polyetherketone resin composition of the invention, means for compounding ingredients is not particularly limited. It is preferred to mix a polyetherketone, a liquid crystal polyester, carbon fibers and, if necessary, a reinforcing material such as glass fibers, inorganic fillers, release agent, heat stabilizer and the like using a Henschel mixer, tumbler or the like and then melt-knead with an extruder.

The shape of carriers for processing and treating semiconductor wafer formed from the polyetherketone resin composition of the present invention is not particularly limited and any known shape can be applied. Generally, the carrier has a shape having plurality of grooves for holding plurality of wafers in an isolated state.

Besides, the polyetherketone resin composition of the invention can also be used for carriers employed in steps of LCD production making use of its excellent heat resistance, dimensional stability, stiffness and antistatic properties.

Since the polyetherketone resin composition of the present invention is excellent in molding properties, dimensional stability, mechanical characteristics and antistatic properties, and the carrier for processing and treating semiconductor wafer molded from said polyetherketone resin composition is suitable for various processing and treating steps such as photoresist baking, washing, treating for diffusion of impurities and the like as well as its storage and transfer, and allows to omit transsshipping of wafers between steps, the composition is very useful in these utilizations. Further, the carrier for processing and treating semiconductor wafer molded from said polyetherketone resin composition is particularly useful for hereafter expected scaling up of wafer.

EXAMPLES

The present invention will now be illustrated with reference to Examples, which should not be construed as a limitation upon the scope of the present invention. Various measurement of properties and testing in the Examples were carried out by the following methods.

(1) Mold shrinkage factor: A flat board test piece of 64 mm square and 3 mm in thickness was molded and its mold shrinkage factor in the flow direction was measured.

(2) Coefficient of linear expansion: An ASTM No. 4 dumbbell was molded and its center part of neck was cut off and coefficient of expansion in the flow direction was measured with thermomechanical analyzer.

(3) Tensile strength: An ASTM No. 4 tensile dumbbell was molded and assayed according to ASTM D638.

(4) Flexural modulus and Deflection temperature under load: a test piece of 127 mm in length, 12.7 mm in width and 6.4 mm in thickness was molded and assayed according to ASTM D 790 and ASTM D 648, respectively.

(5) Surface resistivity: The test piece for measuring mold shrinkage factor was assayed using insulation resistance meter (type: SE-10, manufactured by TOA ELECTRONICS LIMITED) at an electric voltage of 250V.

(6) Melt viscosity: Apparent melt viscosity upon application of a load of 50 kg at 400° C. was measured using a CFT-500 type flow tester manufactured by Shimazu Seisakusho with an orifice of 1 mm in diameter and 10 mm in length.

(7) Chemical resistance test: An ASTM No. 4 dumbbell was molded and assayed for change in weight and retention of tensile strength after dipping for a predetermined period of time in various chemicals at room temperature.

(8) Evaluation of retention of weld strength: A test piece shown in FIG. 1 was molded from a resin composition. The test piece was 3 mm in thickness, 64 mm in outside dimension and 38 mm in inside dimension. Regions including weld lines (welds 1 and 2) and a region excluding weld line (non-weld), shown in FIG. 1, were cut out and flexural strength was measured according to ASTM D790. The average of values of flexural strength for weld 1 and weld 2 regions was calculated and retention as compared with a value of flexural strength of non-weld region was calculated.

Examples 1–5 and Comparative Examples 1–4

Victrex PEEK (manufactured by Victrex), a polyetherketone resin, a liquid crystal polyester, consisted of the repeating structural units (I), (II), (III) and (IV) described above in a molar ratio (I):(II):(III):(IV)=60:20:15:5, and carbon fibers derived from polyacrylonitrile, having an average fiber diameter of 6 μm and an average fiber length of 40–160 μm were mixed in a composition shown in Table I with a Henschel mixer and granulated using a twin-screw extruder (PCM-30 type, manufactured by IKEGAI CORPORATION) at a cylinder temperature of 340° C. to give a polyetherketone resin composition.

The obtained pellets were subjected to injection molding using a PS40E5ASE type injection machine manufactured by NISSEI PLASTIC CO., LTD. at a cylinder temperature of 360° C. and a mold temperature of 160° C. to obtain ASTM No. 4 dumbbells, JIS 1(½) dumbbells, test pieces for bending test and test pieces for mold shrinkage factor assessing, which were used for measurement of mold shrinkage factor, tensile strength and flexural modulus as well as chemical resistance test and weld strength test. The results are shown in Table 1 and Table 2.

The polyetherketone resin composition according to the present invention (Examples 1–5) showed very low values for mold shrinkage factor and coefficient of linear expansion up to 200° C. and are excellent in chemical resistance and mechanical properties. On the other hand, in the compositions (Comparative Examples 1–3) wherein the amounts of liquid crystal polyester are less than 5% by weight per total of polyetherketone and liquid crystal polyester, lowering effect for melt viscosity was insufficient and also lowering effect on mold shrinkage factor and coefficient of linear expansion is not satisfactory. Particularly, the composition (Comparative Example 1) lacking both of liquid crystal polyester and carbon fiber had higher coefficient of linear expansion. Also, the composition (Comparative Example 4) in which the amount of the liquid crystal polyester was more than 50% by weight had lowered retention of weld strength.

Comparative Examples 5 and 6

Results (Comparative Example 5) of tests conducted using compositions mixed and pelletized in a manner similar to that in Example 1 except that the amount of carbon fibers was less than 5 parts by weight are shown in Table 1. The composition of Comparative Example 5 was insufficient in improving effects for antistatic properties and stiffness of the molded product. Also, the composition containing more than 100 parts by weight had very low surface resistivity and bad surface conditions.

Comparative Example 7

Results (Comparative Example 7) of tests conducted using compositions mixed and pelletized in a manner similar to that in Example 1 except that the carbon fibers having an average fiber diameter of 6 μm and an average fiber length of 1000 μm was used are shown in Table 1. The composition (Comparative example 7) in which carbon fibers had an average fiber length more than 500 μm gave a molded product with significantly bad appearance.

TABLE 1

| | Composition (parts by weight) | | | | Coefficient of linear expansion × $10^{-3}$(/°C.) | | | | Deflection temperature under load (°C.) | | | | (1) Surface condition of shaped product | (2) Melt knead-ability |
|---|---|---|---|---|---|---|---|---|---|---|---|---|---|---|
| | Poly-etherketone 150 P | Liquid crystal 450 P | Carbon fiber (average fiber length) | Mold shrinkage factor (%) | 50–150° C. | 150–200° C. | Tensile strength (kg/cm²) | Flexural modulus (kg/cm²) | | Surface resistivity (Ω) | Melt viscosity at 400° C. (poise) | Retention of weld strength (%) | | |
| Example 1 | 77 | — | 23 (160 μm) | 0.60 | 2.0 | 1.0 | 1380 | 80000 | 255 | $10^{10}$–$10^{11}$ | 660 | 73 | o | o |
| Example 2 | 95 | — | 15 (160 μm) | 0.55 | 1.9 | 0.9 | 1450 | 89000 | 260 | $10^{1}$–$10^{9}$ | 800 | 80 | o | o |

TABLE 1-continued

| | Composition (parts by weight) | | | | | Coefficient of linear expansion × 10⁻³(/°C.) | | | | Deflection temperature under load (°C.) | | | | | |
|---|---|---|---|---|---|---|---|---|---|---|---|---|---|---|---|
| | Polyetherketone | | Liquid crystal polyester | Carbon fiber (average fiber length) | Mold shrinkage factor (%) | 50–150° C. | 150–200° C. | Tensile strength (kg/cm²) | Flexural modulus (kg/cm²) | | Surface resistivity (Ω) | Melt viscosity at 400° C. (poise) | Retention of weld strength (%) | Surface condition of shaped product (1) | Melt knead-ability (2) |
| | 150 P | 450 P | poly-ester | | | | | | | | | | | | |
| Example 3 | 77 | — | 23 | 30 (70 μm) | 0.58 | 2.0 | 1.1 | 1410 | 82000 | 256 | $10^1$–$10^9$ | 750 | 71 | o | o |
| Example 4 | 77 | — | 23 | 40 (40 μm) | 0.57 | 2.0 | 1.0 | 1400 | 83000 | 260 | $10^1$–$10^3$ | 820 | 70 | o | o |
| Example 5 | — | 77 | 23 | 15 (160 μm) | 0.55 | 2.0 | 1.0 | 1230 | 72000 | 242 | $10^{10}$–$10^{11}$ | 2620 | 71 | o | o |
| Comparative Example 1 | 100 | — | 0 | 0 | 1.70 | 2.1 | 19.0 | 1400 | 38000 | 166 | $10^{16}$ | 1400 | 98 | o | o |
| Comparative Example 2 | 100 | — | 0 | 15 (160 μm) | 0.81 | 1.9 | 4.0 | 1030 | 68500 | 223 | $10^{10}$–$10^{11}$ | 2100 | 83 | o | o |
| Comparative Example 3 | 98 | — | 2 | 15 (160 μm) | 0.78 | 1.9 | 4.0 | 1410 | 70000 | 228 | $10^{10}$–$10^{11}$ | 2010 | 79 | o | o |
| Comparative Example 4 | 40 | — | 60 | 15 (160 μm) | 0.41 | 1.5 | 1.0 | 1290 | 105000 | 273 | $10^{10}$–$10^{11}$ | <100 | 45 | o | o |
| Comparative Example 5 | 77 | — | 23 | 2 (160 μm) | 0.70 | 2.0 | 1.7 | 1270 | 54000 | 254 | $10^{16}$ | 560 | 94 | o | o |
| Comparative Example 6 | 77 | — | 23 | 110 (160 μm) | 0.21 | 1.7 | 0.9 | 2550 | 160000 | 280 | $10^3$ | 2150 | 53 | o | o |
| Comparative Example 7 | 77 | — | 23 | 15 (1000 μm) | 0.11 | 1.9 | 1.0 | 1710 | 110000 | 280 | $10^5$ | 860 | 63 | o | o |

(1)Visual evaluation, o: good; x: bad
(2)o: good; x: taking up by extruder is bad

TABLE 2

| | | Chemical Resistance(1) | | | | | | | |
|---|---|---|---|---|---|---|---|---|---|
| | | Increase in weight (%) | | | | Retention of strength (%) | | | |
| | Name of chemicals | Example 1 | Example 2 | Example 3 | Example 4 | Example 1 | Example 2 | Example 3 | Example 4 |
| Organic chemicals | isopropyl alcohol | 0 | 0 | 0 | 0 | 100 | 100 | 100 | 100 |
| | Acetone | 0 | 0 | 0 | 0 | 100 | 100 | 100 | 100 |
| | Chloroform | 0 | 0 | 0 | 0 | 100 | 100 | 100 | 100 |
| | Trichlene | 0 | 0 | 0 | 0 | 100 | 100 | 99 | 100 |
| | Ethyl acetate | 0 | 0 | 0 | 0 | 100 | 100 | 100 | 100 |
| | Methyl ethyl ketone | 0 | 0 | 0 | 0 | 100 | 100 | 100 | 100 |
| | N-methyl-2-pyrrolidone | 0 | 0 | 0 | 0 | 100 | 100 | 100 | 100 |
| Inorganic chemicals | 30% Aqueous hydrogen peroxide | 0 | 0 | −1 | 0 | 100 | 100 | 100 | 100 |
| | 40% Nitric acid | 0 | 0 | 0 | 0 | 100 | 100 | 100 | 100 |
| | 50% sulfuric acid | 0 | 0 | 0 | 0 | 100 | 100 | 100 | 100 |
| | 10% Aqueous sodium hydroxide | 0 | 0 | 0 | 0 | 100 | 100 | 99 | 100 |

(1)Values measured after dipping at room temperature for two weeks

What is claimed is:

1. A polyetherketone resin composition comprising 5–100 parts by weight of a carbon fiber having an average fiber diameter of 5–20 μm and an average fiber length of 30–500 μm per 100 parts by weight of a composition comprising 95-50% by weight of a polyetherketone and 5–50% by weight of a liquid crystal polyester.

2. A polyetherketone resin composition according to claim 1 which has a surface resistivity of $10^8$–$10^{12}Ω$ after shaping.

3. A polyetherketone resin composition according to claim 1 or 2, in which the liquid crystal polyester comprises at least 30% by mole of a repeating structural unit represented by the following formula (A1):

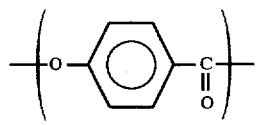

(A₁)

4. A polyetherketone resin composition according to claim 1 or 2, in which the liquid crystal polyester comprises repeating structural units (I), (II), (III) and (IV), shown below, in a molar ratio (II)/(I) of 0.2–1.0, a molar ratio [(III)+(IV)]/(II) of 0.9–1.1 and a molar ratio (IV)/(III) of 0–0.1.

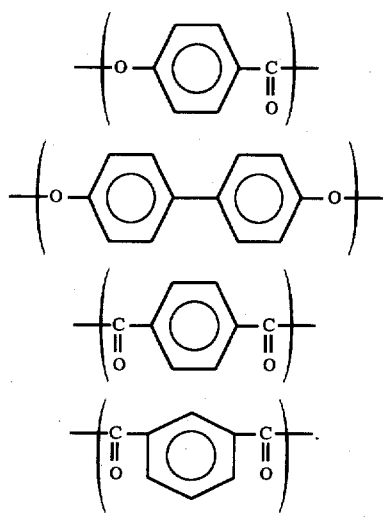

5. A polyetherketone resin composition according to claim 1 or 2, in which the polyetherketone has a structure represented by the following formula:

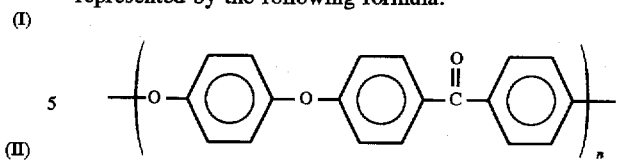

6. A polyetherketone resin composition according to claim 5, in which the polyetherketone has a melt viscosity of 500–3800 poise, said melt viscosity being an apparent melt viscosity observed when a resin sample heated at 400° C. is extruded through a nozzle 1 mm in inner diameter and 10 mm length at a shear rate of 1000 $\sec^{-1}$.

7. A carrier for processing or treating a semiconductor wafer molded from the polyetherketone resin composition according to claim 1 or 2, wherein the carrier has a plurality of grooves for holding a plurality of wafers in an isolated stated.

* * * * *